(12) United States Patent
Sagardoyburu et al.

(10) Patent No.: US 12,007,633 B2
(45) Date of Patent: Jun. 11, 2024

(54) LIQUID CRYSTAL DISPLAY DEVICE WITH DECORATIVE PATTERN DIRECTLY THEREON

(71) Applicant: The Swatch Group Research and Development Ltd., Marin (CH)

(72) Inventors: Michel Sagardoyburu, Neuchâtel (CH); Loïc Curchod, Lausanne (CH)

(73) Assignee: The Swatch Group Research and Development Ltd, Marin (CH)

(*) Notice: Subject to any disclaimer, the term of this patent is extended or adjusted under 35 U.S.C. 154(b) by 0 days.

(21) Appl. No.: 17/000,600

(22) Filed: Aug. 24, 2020

(65) Prior Publication Data

US 2021/0181564 A1    Jun. 17, 2021

(30) Foreign Application Priority Data

Dec. 17, 2019  (EP) ..................................... 19217221

(51) Int. Cl.
*G02F 1/1333*    (2006.01)
*G02F 1/1335*    (2006.01)
(Continued)

(52) U.S. Cl.
CPC .. *G02F 1/133308* (2013.01); *G02F 1/133536* (2013.01); *G02F 1/133553* (2013.01); *G02F 1/134309* (2013.01); *G04B 19/268* (2013.01); *G04C 17/0091* (2013.01); *G02F 1/133314* (2021.01); *G02F 1/13332* (2021.01)

(58) Field of Classification Search
CPC ......... G02F 1/133308; G02F 1/133314; G02F 1/13332
See application file for complete search history.

(56) References Cited

U.S. PATENT DOCUMENTS 5,245,590 A    9/1993  Galison
5,740,130 A    4/1998  Grupp et al.
(Continued)

FOREIGN PATENT DOCUMENTS

CN    1201921 A    12/1998
CN    202230680 U    5/2012
(Continued)

OTHER PUBLICATIONS

European Search Report for EP 19 21 7221, dated Apr. 20, 2020.
Notice of Reason for Refusal dated Nov. 2, 2021 from the Japanese Patent Office in Japanese Application No. 2020-151791.

*Primary Examiner* — Lauren Nguyen
(74) *Attorney, Agent, or Firm* — Sughrue Mion, PLLC

(57) ABSTRACT

A liquid crystal display device, the display device including: two facing transparent substrates designated respectively front substrate and rear substrate, the front substrate being same disposed on the observer side, the front and rear substrates being provided on the inner faces thereof with transparent structured electrodes whereof the superposition defines shape pixels switchable between two optical states, the electrodes being connected to a voltage source via a control circuit, forming a cell closed by a sealing frame for receiving in the spaced delimited by the substrates and the sealing frame a liquid crystal composition; and a decorative pattern in direct contact with the front substrate or the rear substrate.

19 Claims, 3 Drawing Sheets

(51) Int. Cl.
*G02F 1/1343* (2006.01)
*G04B 19/26* (2006.01)
*G04C 17/00* (2006.01)

(56) References Cited

U.S. PATENT DOCUMENTS

| | | | |
|---|---|---|---|
| 6,147,934 | A | 11/2000 | Arikawa et al. |
| 2004/0257496 | A1* | 12/2004 | Sonoda ............. G02F 1/134309 |
| | | | 349/95 |
| 2005/0030836 | A1* | 2/2005 | Burns .................... G04C 17/00 |
| | | | 368/232 |
| 2007/0153162 | A1* | 7/2007 | Wright ................. G02B 5/3025 |
| | | | 349/96 |
| 2008/0123473 | A1* | 5/2008 | Ozawa .................... G04G 9/00 |
| | | | 368/80 |
| 2009/0134001 | A1* | 5/2009 | Yamaue ................. G06F 3/045 |
| | | | 200/512 |
| 2010/0245221 | A1* | 9/2010 | Khan ................. G02F 1/13476 |
| | | | 345/87 |
| 2014/0098332 | A1 | 4/2014 | Kim et al. |
| 2015/0107881 | A1* | 4/2015 | Mori .................... H05K 1/0306 |
| | | | 156/247 |
| 2018/0267345 | A1 | 9/2018 | Chen |

FOREIGN PATENT DOCUMENTS

| | | | |
|---|---|---|---|
| EP | 0 939 331 A2 | 9/1999 | |
| JP | 55-60921 A | 5/1980 | |
| JP | 2007-47030 A | 2/2007 | |
| JP | 2008-83607 * | 4/2008 | ........... G02F 1/1333 |
| JP | 2008-83607 A | 4/2008 | |
| JP | 2009-8710 A | 1/2009 | |

\* cited by examiner

LIQUID CRYSTAL DISPLAY DEVICE WITH DECORATIVE PATTERN DIRECTLY THEREON

CROSS REFERENCE TO RELATED APPLICATIONS

This application claims priority to European Patent Application No. 19217221.1 filed Dec. 17, 2019, the entire contents of which are incorporated herein by reference.

TECHNICAL FIELD

The invention relates to a liquid crystal display device, a dial assembly for a timepiece comprising a dial and such a display device. The invention also relates to a timepiece and/or piece of jewellery comprising such a display device as well as a method for manufacturing such a liquid crystal display device.

TECHNOLOGICAL BACKGROUND

Liquid crystal display devices are well known in the watchmaking field since the 1960s. At the time, liquid crystal display devices were used to display or hide various segments that formed, together, numerals for example to indicate the time.

Currently, the possibilities offered by liquid crystal display devices are well developed. For example, a decoration printed on a plastic film can be placed between the polarizers of the display. The display may allow various portions of the printed decoration to be selectively shown. The film made of transparent plastic may receive a decoration digitally printed by ink jet. The inks of the image may be opaque or semi-transparent in order to produce colour filters. The film and the printing thereof are laminated by means of an optically transparent adhesive film on the rear face of the liquid crystal cell. It is also possible to laminate the film and the printing thereof on the front face of the liquid crystal cell. The adhesive film typically has a height between 15 µm and 100 µm.

Another possibility is to decorate the front face of the upper polarizer by ink printing, the most often by silkscreen. Obviously, it is possible to decorate the rear face of the rear polarizer by ink printing, also the most often by silkscreen.

On the other hand, colour matrix liquid crystal displays exist. Said latter use colour filters (red, green, blue and black) to filter the colour of the pixels of the matrix (red, green or blue) or mask the areas between the pixels (with black). Said colour filters are generally placed on the inner face of the front substrate of the liquid crystal cell, under the transparent electrode. Said filters are produced by digital printing or by application of photostructurable resins that are chemical bath structured by a photolithography method. Introducing the filters into the cell under the electrode adds a technological complication to the method in the sense that after producing said multiple colour filters, it is necessary to add a planarization layer on which the transparent electrode is deposited.

GENERAL DESCRIPTION OF THE INVENTION

One first aspect of the invention relates to a liquid crystal display (LCD) device, the display device comprising: two facing transparent substrates designated respectively front substrate and rear substrate, the front substrate being same disposed on the observer side, the front and rear substrates being provided on the inner faces thereof with transparent structured electrodes whereof the superposition defines a shape pixel switchable between two optical states, the electrodes being connected to a voltage source via a control circuit, forming a cell closed by a sealing frame for receiving in the space delimited by the substrates and the sealing frame a liquid crystal composition. In addition, the device comprises a decorative pattern in direct contact with the front substrate and/or the rear substrate It will be appreciated that the fact of having a direct contact between the decorative pattern and one of the substrates makes possible a plurality of advantages: A) The alignment of the decorative pattern in relation to the switchable shape pixel of the liquid crystal display is better because the decoration and the shape pixel are closer. On the one hand, the alignment may be produced more easily (e.g. optically) in relation to the conductive paths during the method for manufacturing the watch, before various optical films prevent the conductive paths from being displayed accurately. B) On the other hand, the parallax is reduced to the thickness alone of the substrate (e.g. when thin substrates, of 50 to 300 µm of thickness, are used, the parallax is very small and the resulting optical defects are not visible to the naked eye). C) Reduced parallax and accurate alignment make it possible to produce a fine image and with a high degree of details that harmonises well with the shape pixel of the LCD. Thus, there is no crosstalk and the shape pixel may cover exactly the desired area of the decoration, regardless of the angle of observation, resulting in a high-quality animated image. D) Because the decorative layer is in direct contact with the substrate of the LCD and without support film, same is as close as possible to the reflector, which makes possible a high-resolution image having very small apertures for reflecting more light. The reflectivity of the image is thus improved, because the light rays reflected with a high angle of incidence are less likely to be absorbed.

The transparent structured electrodes may be made of indium tin oxide (ITO), or made of indium zinc oxide (IZO) or any other transparent electrode commonly used in the manufacturing of electronic displays.

According to one embodiment, the liquid crystal cell may comprise one or more liquid crystal alignment layers arranged on the electrodes. Preferably, the one or more liquid crystal alignment layers impose a twisted nematic liquid crystal mode or a super-twisted nematic liquid crystal mode with liquid crystals in the liquid crystal cell.

Other modes may be considered, such as the VA (vertical alignment) mode or the ECB (electrically controlled birefringence) mode (or other variations deriving from the combination of the aforementioned modes).

The decorative pattern may be disposed on an outer surface of the front or rear substrates. Preferably, the decorative pattern is disposed on the outer surface of the rear substrate.

According to a preferred embodiment, the decorative pattern is aligned with the structured electrodes.

The decorative pattern may be an image complementing the shape pixels defined by the electrodes.

The decorative pattern may be a digitally printed decorative pattern, optionally by ink jet, or comprise a structured ink layer. Digital printing refers to a method for printing a digital image on a substrate. Examples of digital printing methods comprise ink jet printing and laser printing. In the ink jet printing methods, the image is formed by the projection of droplets of ink on the substrate. The ink may comprise pigments and/or dyes as colorants. The ink may or may not be photosensitive. The decorative pattern is preferably digitally printed by ink jet.

Alternatively or additionally, the decorative pattern may comprise one or more decorative layers of structured photosensitive resins and/or one or more structured decorative thin layers (metal, absorbing dielectric (e.g.: TiAlON, WO, TiN, etc.) or dielectric mirror).

The set of layers forming the decorative pattern is supported directly by the front substrate or the rear substrate.

The front substrate and/or rear substrate may have a thickness in the range of 50 μm to 1 mm, preferably in the range of 80 μm to 0.5 mm.

According to one embodiment, the front substrate is associated with a transmissive and absorbing front polarizer. In addition, the rear substrate is associated with an absorbing and reflective rear polarizer. The decorative pattern is disposed between the rear substrate and the rear polarizer.

According to one embodiment, the front substrate is associated with a transmissive and absorbing front polarizer. In addition, the rear substrate is associated with an absorbing and reflective rear polarizer. The decorative pattern is disposed between the front substrate and the front polarizer.

According to one embodiment, the front substrate is associated with a transmissive and absorbing front polarizer. In addition, the rear substrate is associated with a reflector. The decorative pattern is disposed between the front substrate and the front polarizer.

The liquid crystal composition may comprise a dichroic colorant. The rear substrate is then associated with a reflector. The decorative pattern may be disposed either on the outer surface of the front substrate or between the rear substrate and the reflector.

According to one embodiment, the liquid crystal composition comprises a dichroic colorant. The front substrate is associated with a transmissive absorbing polarizer. The rear substrate is associated with a reflector. The decorative pattern may be disposed either between the front polarizer and the front substrate, or between the rear substrate and the reflector.

According to one embodiment, the liquid crystal composition comprises a dichroic colorant. The rear substrate is associated with an absorbing reflective rear polarizer. The decorative pattern may be disposed between the rear polarizer and the rear substrate.

The display may be reflective, emissive or transflective. Transflective display means a hybrid transmissive and reflective display. The display is transmissive in the sense that a backlight is arranged behind the rear substrate. The display is also reflective in the sense that the incident ambient light is reflected by a semi-reflective and semi-transparent reflector behind the rear substrate. In the case of a transflective display, the semi-reflective and semi-transparent reflector will combine the property of reflecting the ambient light whilst making it possible to transmit the light of the backlight.

The rear polarizer may be replaced with a transflective polarizer. A backlit device may be disposed at the rear of the transflective polarizer.

The rear polarizer may be replaced with a transparent absorbing polarizer. A backlit device may be disposed at the rear of the transflective polarizer.

According to one specific embodiment of the invention, the decorative pattern is in direct contact with the front substrate and with the rear substrate and wherein the decorative pattern is produced in at least two pattern portions complementing one another the juxtaposition of the two complementing pattern portions forming said decorative pattern.

A second aspect of the invention relates to a timepiece and/or piece of jewellery (e.g. a watch) and/or a portable electronic part (e.g. smart sportswear, portable measuring instruments, etc.) and/or non-portable electronic part (e.g. home automation) comprising a liquid crystal display device such as described above.

A third aspect of the invention relates to a method for manufacturing a liquid crystal display device. The method comprises:
  providing a front substrate and a rear substrate, the front and rear substrates being provided on the inner faces thereof with transparent structured electrodes whereof the superposition defines shape pixels switchable between two optical states;
  arranging a sealing frame on the inner face of one of the two substrates;
  sealing the two substrates together in order to define a space delimited by the substrates;
  filling the space delimited by the substrates with a liquid crystal composition; and
  applying a decorative pattern in direct contact with the front substrate or the rear substrate.

The application of the decorative pattern may comprise:
  either digitally printing the decorative pattern, preferably by ink jet,
  or applying and structuring, preferably by photolithography, a photosensitive resin,
  or physical or chemical vapour deposition of a thin metal and/or dielectric layer (typically less than 10 microns and preferably less than 1 micron) and structuring the thin layer deposited, preferably by photolithography,
  or a combination of said application methods.

The combination of said application methods may make it possible to apply a plurality of decorative layers in order to produce more complex decorations with various degrees of resolution or finesse.

Also according to another aspect, the invention relates to a dial assembly for a timepiece comprising a dial and a liquid crystal display device, the display device comprising: two facing transparent substrates designated respectively front substrate and rear substrate, the front substrate being same disposed on the observer side, the front and rear substrates being provided on the inner faces thereof with transparent structured electrodes whereof the superposition defines shape pixels switchable between two optical states, the electrodes being connected to a voltage source via a control circuit, forming a cell closed by a sealing frame for receiving in the spaced delimited by the substrates and the sealing frame a liquid crystal composition; and a decorative pattern in direct contact with the front substrate and/or with the rear substrate, said dial supporting a static image complementing same of the decorative pattern of the display device. Thus, it may be possible to have, for example, the dial that forms the sky with fixed stars, and the decorative pattern may represent certain planets, comets or other celestial objects (natural or artificial satellites) that will be shown dynamically by the liquid crystal display device.

BRIEF DESCRIPTION OF THE DRAWINGS

Other characteristics and features of the invention will become apparent from the detailed description of certain advantageous embodiments presented below, by way of illustration, with reference to the appended drawings that show.

DETAILED DESCRIPTION OF A PLURALITY OF EMBODIMENTS OF THE INVENTION

Figure 1:
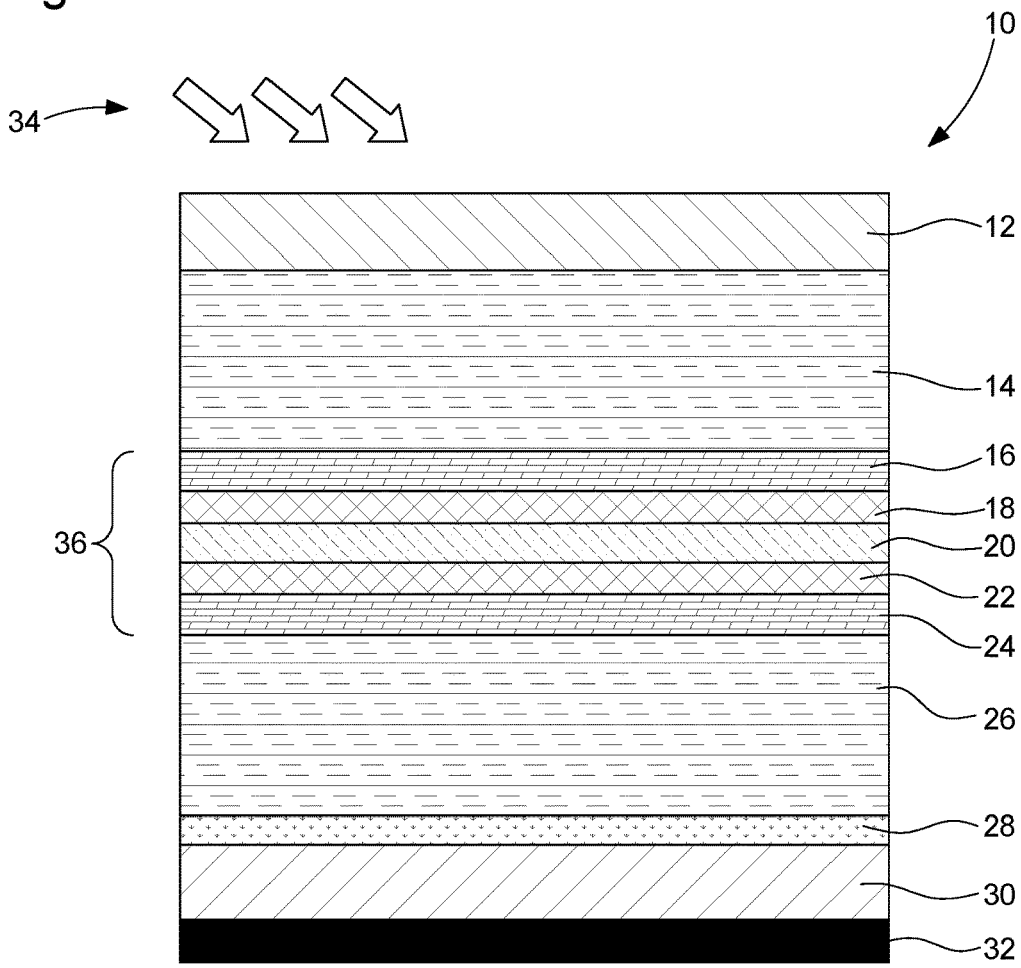
FIG. 1: a sectional view of a liquid crystal display device of a watch according to one embodiment of the invention.

FIG. 1 illustrates a reflective liquid crystal display device 10 of a watch according to one embodiment of the invention. The display device 10 comprises a transmissive and absorbing (absorbing for a polarization of the light and transmissive for the orthogonal polarization) front polarizer 12, a transparent front substrate 14, a structured transparent front electrode 16, a front alignment layer 18, a liquid crystal composition 20, a rear alignment layer 22, a structured transparent rear electrode 24, a rear substrate 26, a decorative pattern 28, a transmissive and reflective rear polarizer 30 and a black back 32 (or, according to another embodiment, coloured). Alternatively, the rear polarizer 30 may be a transmissive and absorbing polarizer associated with a reflector. The display device 10 is reflective in the sense that the surrounding incident light 34 is used as light source for the display. The surrounding incident light 34 passes through the various layers of the display device 10 in the order mentioned above, is reflected on the rear polarizer 30 and returns to the eye of the user. The superposition of the structured electrodes 16, 24 defines a set of shape pixels switchable between two optical states. The electrodes 16, 24 are connected to a voltage source (not shown) via a control circuit (not shown). The application of a voltage (or the absence of application) makes it possible to produce a switching between the two optical states of the liquid crystals 20.

The front substrate 14 and the rear substrate 26 may be made of glass or of plastic. The substrates 14, 26 are oppositely arranged in order to create a liquid crystal cell 36 between the front substrate and the rear substrate. The liquid crystal cell 36 that comprises the front electrode 16, the front alignment layer 18, the liquid crystal composition 20, the rear alignment layer 22 and the rear electrode 24. The alignment layers 18, 22 force the liquid crystals 20 to adopt a twisted configuration when no electric field is applied by the electrodes 16, 24. The alignment layers 18, 22 may be, for example, made of polyimide. According to the orientation of the polarizers 12, 30, the display device 10 may operate in "normally white" mode, that is to say a mode wherein the light is reflected when no electric field is applied to the liquid crystals, or in "normally black" mode, that is to say wherein the light is not reflected when no electric field is applied to the liquid crystals. The other optical state is reached when an electric field is applied between the electrodes 16, 24.

Figure 2:
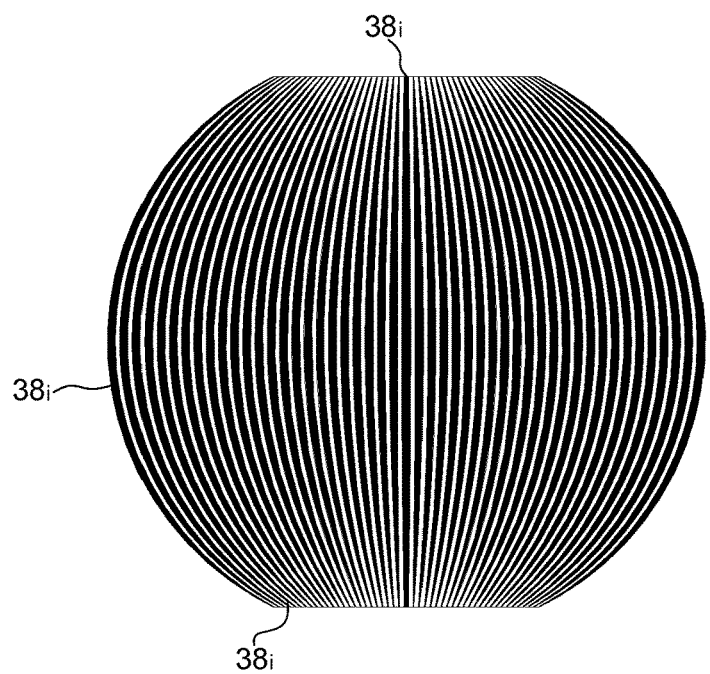
FIG. 2: a top view of an electrode for a liquid crystal display device of a watch according to one embodiment of the invention.

The liquid crystals 20 of the display device 10 are arranged according to a plurality of units (also called shape pixels), defined by the structured electrodes 16, 24, independently switchable in the sense that the optical state of a first shape pixel does not affect the optical state of a second shape pixel directly adjacent to the first shape pixel. The various shape pixels are switched thanks to a voltage delivered by the structured electrodes 16, 24. FIG. 2 illustrates a possible structuring of the electrodes 16, 24. Crescent-shaped shape pixels $38_i$ (in black in FIG. 2) are defined in order to be able to selectively switch the state of the liquid crystals located at the shape pixels $38_i$, between the front electrode 16 and the rear electrode 24. A switching shape pixel $38_i$ may cover one or more elements of the decorative layer. Said elements may be continuous portions of the decorative pattern and/or pixels forming said decorative pattern in the case of a high-resolution image. The shape pixels may be arranged in an even manner (e.g. for matrix displays) or not. The shape of the shape pixels is not limited. As indicated above, same may have, for example, a crescent shape, or more simply a rectangular or square shape when same are observed from the top of the display.

The front substrate 14 and/or the rear substrate 26 have a thickness in the range of 50 μm to 1 mm, preferably in the range of 80 μm to 0.5 mm. According to a first embodiment, the decorative pattern 28 is digitally printed by ink jet directly on the outer surface of the rear substrate 26. The pattern may comprise absorbing areas and transparent areas making it possible for the light to (partially) pass through the decorative pattern to reach the rear polarizer 30.

It will be appreciated that the fact of printing the decorative layer directly on the substrate 26 overcomes a plurality of drawbacks of the solutions proposed by the prior art. Particularly, the alignment between the elements of the decorative pattern and the switching segments $38_i$ is more accurate. The alignment may generally be produced with an accuracy of 5 μm or less, because the decorative pattern 28 is very close to the switching segments $38_i$ defined by the structured electrodes 16, 24 in relation to the solutions of the prior art. This has the consequence that the switching segments $38_i$ cover exactly the desired areas of the decorative pattern, regardless of the angle of observation of the display device. "Exactly" means that the offset is less than 5 μm and therefore will not be visible to the naked eye of the user. The aesthetics will appear flawless. On the other hand, the alignment may be produced optically in relation to the switching segments $38_i$ during the manufacturing of the display, before other layers prevent the electrodes from being displayed, particularly the structure of the electrodes. It is also noted that the parallax is reduced to the thickness alone of the substrate. The use of thin substrates (50 to 300 μm) makes it possible to reduce the parallax such that the resulting optical defects are not visible to the naked eye. In addition, even if the decorative pattern 28 comprises very small transparent apertures, more light may be reflected because the decorative pattern 28 is located directly under the substrate and without support film between the decorative layer and the rear polarizer 30. The light rays reflected with a high angle of incidence are therefore less likely to be absorbed. The reflectivity (and therefore the visibility) of the decorative pattern 28 is thus improved in relation to the prior art.

Figure 5:
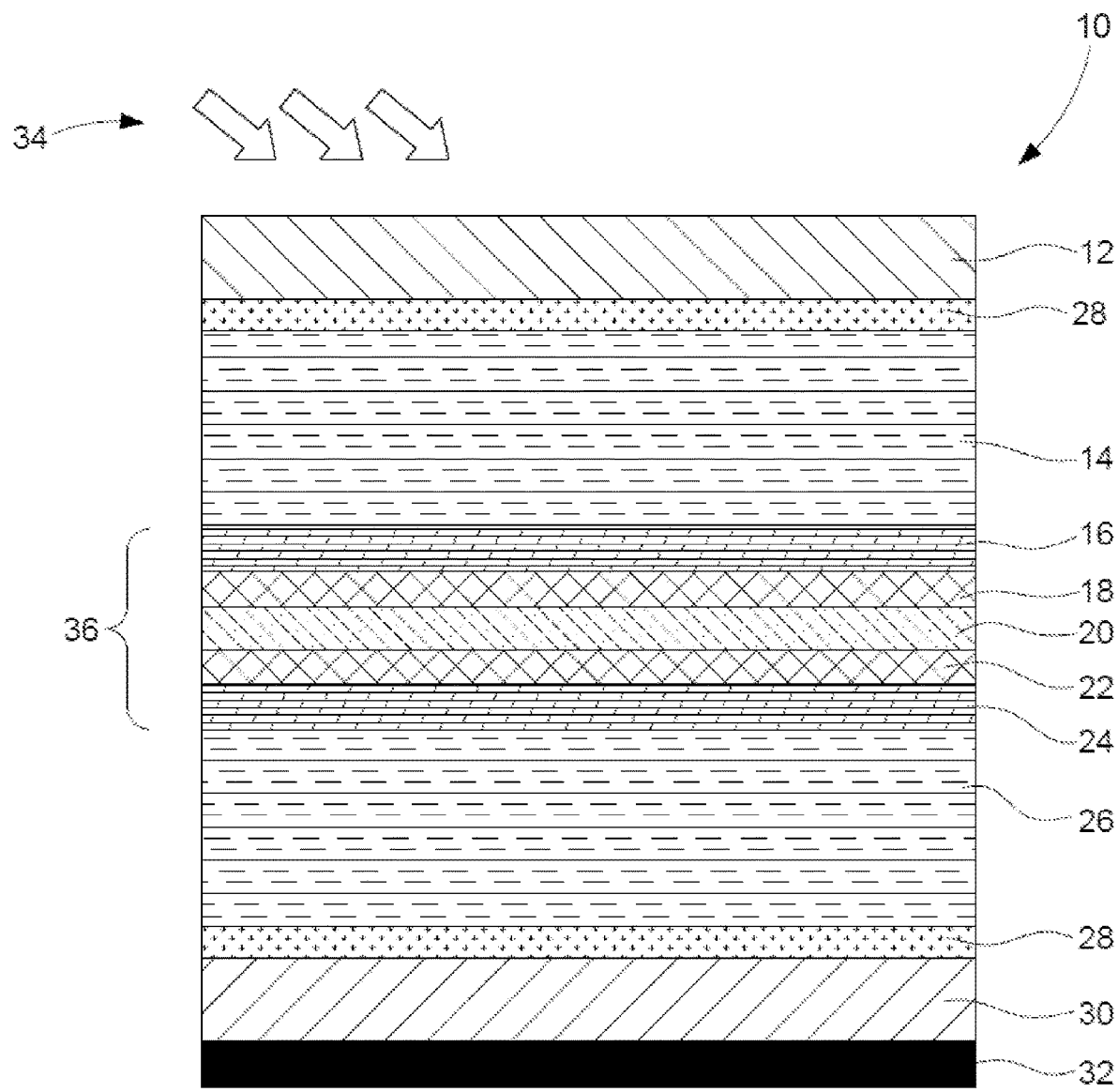
FIG. 5: a sectional view of a liquid crystal display device of a watch according to one embodiment of the invention.

According to a second embodiment of the invention, the decorative pattern 28 may be applied on the outer surface of the front substrate 14 instead of being applied on the outer surface of the rear substrate 26 (see first embodiment). Obviously, it is possible to combine the first and the second embodiment in order to obtain a 15 display device comprising two decorative patterns. For example, FIG. 5 illustrates an example of a combination of the first and second embodiments, in which two decorative patterns 28 are provided.

According to a third embodiment of the invention, one or more photostructurable resins may be deposited and structured by photolithography on the outer surface of the front substrate 14 and/or on the outer surface of the rear substrate 26. The resins may be coloured or black and be arranged so as to form a decorative pattern 28 after deposition.

According to a fourth embodiment of the invention, the decorative pattern 28 may be a thin metal (e.g. a layer of aluminium, a layer of gold, a layer of silver, a layer of chromium) and/or dielectric (e.g. a layer of coloured oxinitrides) layer deposited by physical or chemical vapour deposition. The decorative pattern 28 may be structured, in particular by photolithography-etching. It is also possible to produce the deposition and the structuring in a single step by deposition through a mask.

It should be noted that it is possible to combine the decorative patterns 28 described above in order to produce a decorative pattern 28 on the outer surface of the front substrate and/or on the outer surface of the rear substrate comprising a decorative pattern produced such as indicated above.

According to other embodiments, other arrangements of polarizers and of decorative patterns may be contemplated. For example, the front substrate may be associated with a transmissive and absorbing front polarizer and the rear substrate may be associated with a reflector. The decorative pattern is disposed between the front substrate and the front polarizer.

The liquid crystal composition may comprise a dichroic colorant. In this case, various arrangements may also be contemplated.

According to a first example, the rear substrate is associated with a reflector. The decorative pattern may then be disposed either on the outer surface of the front substrate or between the rear substrate and the reflector. According to a second example, the front substrate is associated with a transmissive absorbing polarizer and the rear substrate is associated with a reflector. The decorative pattern may then be disposed either between the front polarizer and the front substrate, or between the rear substrate and the reflector. According to a third example, the rear substrate is associated with an absorbing reflective rear polarizer. The decorative pattern may then be disposed between the rear polarizer and the rear substrate.

According to one embodiment of the invention, the display device 10 may be transflective. In this case, the display device 10 comprises a backlight 40 arranged at the rear of a semi-transparent black back 32 (see FIG. 3). In another embodiment, the semi-transparent black back 32 could be replaced with an absorbing/transparent polarizer. In another embodiment of transflective display device, the rear polarizer 30 could be replaced with a reflective/transmissive polarizer partially effective in the reflective function thereof, and the black back 32 would be replaced with an absorbing/transmissive polarizer or a semi-absorbing back. In another embodiment, the rear polarizer 30 and the black back 32 assembly would be replaced with a transflective polarizer. The backlight emits the light 42 and may comprise one or more inorganic electroluminescent diodes and/or a plurality of organic electroluminescent diodes.

According to one embodiment of the invention, the display device 10 may be transmissive. In this case, the display device 10 comprises a backlight 40 arranged at the rear of a display device characterised in that the rear polarizer 30 is an absorbing/transmissive polarizer and that there is no longer a black back.

An example of application of such a display device in watchmaking or jewellery-making consists in the production of a moon phase by the combination of a high-resolution decorative pattern of the moon with a liquid crystal cell whereof the segments of the electrodes are arranged to form a multitude of crescents (see FIG. 2) that, aligned with the decorative pattern of the moon, make it possible to display the evolution of the phases of the moon. The liquid crystal display device is used to hide the portions of the moon that are currently hidden by the shadow of the Earth. It is also possible that the electrodes comprise other segments for displaying additional information such as the time, the date, the day, meteorological, barometric, altimetric information or for animating decorative or fun elements such as twinkling stars in the starry sky around the Moon. It should be noted that the present invention also has an interest in sportwear type products.

It can also be envisaged according to one variant of the invention of doing the same with a solar or lunar eclipse, the pattern being an image of a celestial body, the display device comprising a plurality of switchable shape pixels defined by the transparent structured electrodes and showing shape segments capable of representing an animated image of said celestial body in order to represent said eclipse. Of course other celestial objects such as comets, natural or artificial satellites may be shown dynamically in a similar manner on the display.

It will be noted that when the device is combined with a transflector at the rear the associated backlighting device may emit a modulable colour in order to better match the reality of the colours of the object of the pattern to be represented, in particular during partial or total eclipses.

Figure 3:
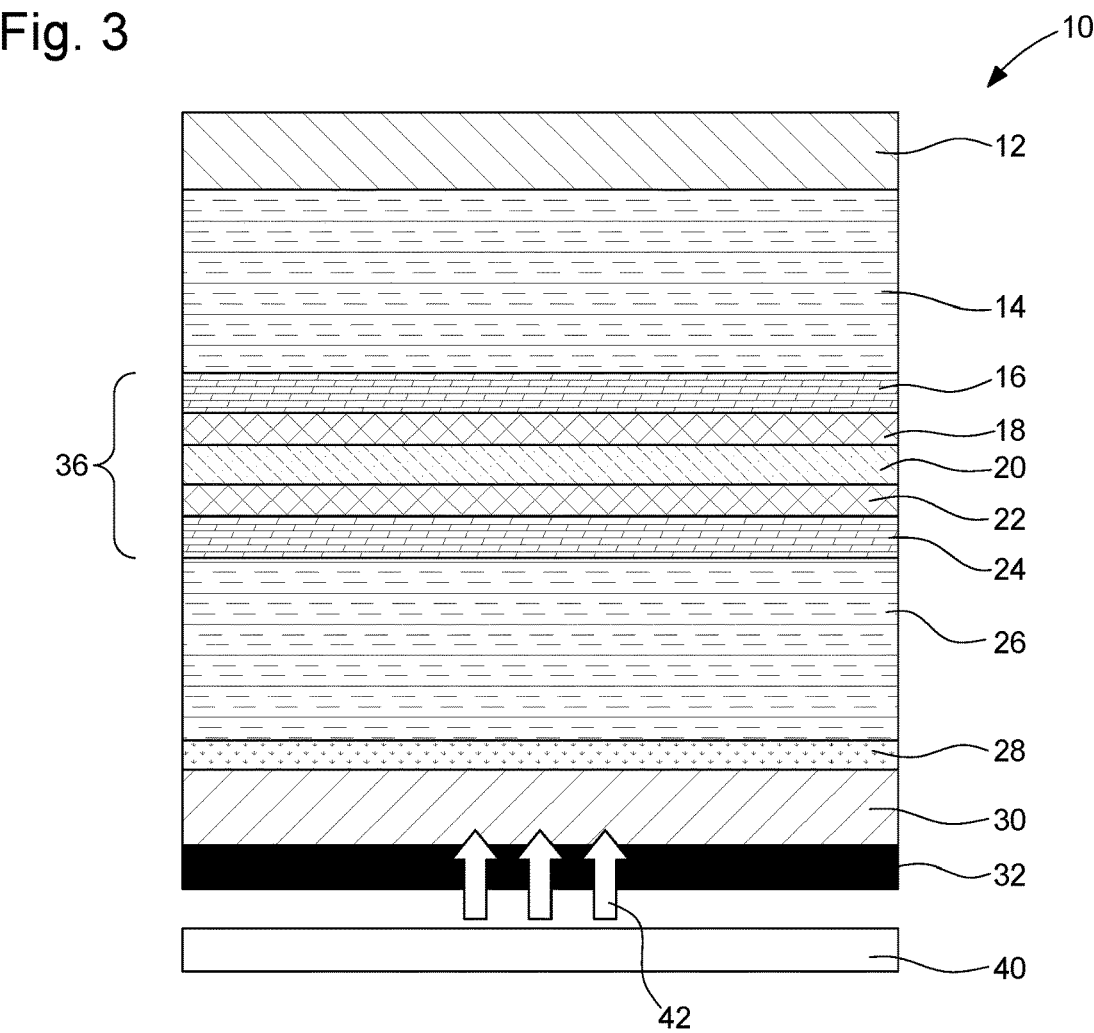
FIG. 3: a sectional view of a liquid crystal display device of a watch according to one embodiment of the invention.
Figure 4:
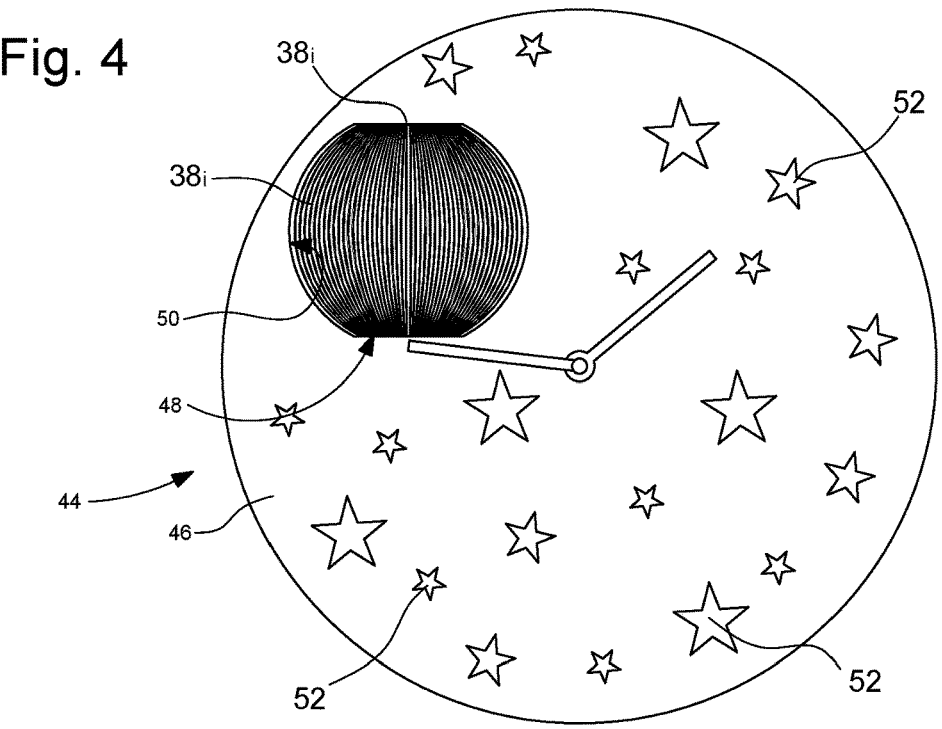
FIG. 4: a front view of a dial assembly for a timepiece comprising a dial and a liquid crystal display device according to the invention.

In FIG. 4 is shown a dial assembly 44 for a timepiece (not shown) comprising a dial 46 and a liquid crystal display device 48 of the type of same described in connection with FIGS. 1 to 3. The display device 48 is visible through a window 50 provided in the dial 46. In the example illustrated, the dial 46 comprises a fixed image that forms the sky with fixed stars 52, and the decorative pattern of the display represents a moon in the form of a plurality of shape pixels 38i as described previously in connection with FIG. 2, said pattern being able to show dynamically the evolution of the phases of the moon. Alternatively, the decorative pattern may represent, in the form of a set of shape pixels, certain planets, comets or other celestial objects (natural or artificial satellites) that will be shown dynamically by the liquid crystal display device.

Even though specific embodiments have just been described in detail, the person skilled in the art will appreciate that various modifications and alternatives to same may be developed in light of the overall information provided by the present disclosure of the invention. Consequently, the arrangements and/or specific methods described herein are intended to be given only by way of illustration, with no intention of limiting the scope of the invention, which is determined by the scope of the attached claims.

The invention claimed is:

1. A liquid crystal display device, the display device comprising:
   two facing transparent substrates designated respectively front substrate and rear substrate, the front substrate being same disposed on the observer side, the front and rear substrates being directly provided on the inner faces thereof with transparent structured electrodes whereof the superposition defines shape pixels switchable between two optical states, the electrodes being connected to a voltage source via a control circuit, and the two facing transparent substrates forming a cell closed by a sealing frame for receiving a liquid crystal composition in the space delimited by the substrates and the sealing frame;

a decorative pattern in direct contact with the front substrate and/or the rear substrate; and the liquid crystal composition, the liquid crystal composition being between the two facing transparent substrates, wherein the shape pixels comprise crescent-shaped pixels and the shape pixels, in combination, have a shape of a celestial body, and wherein the decorative pattern is aligned with the transparent structured electrodes such that the decorative pattern has the shape of the celestial body and a size of the shape pixels.

2. The display device according to claim 1, wherein the decorative pattern is disposed directly on an outer surface of the front or rear substrates.

3. The display device according to claim 1, wherein the decorative pattern is disposed directly on the outer surface of the rear substrate.

4. The display device according to claim 1, wherein the decorative pattern comprises at least one structured ink layer, photosensitive or not, at least one thin structured dielectric or structured metal layer, or a combination of said various layers, all of said decorative layers being supported directly by the front substrate or the rear substrate.

5. The display device according to claim 1, wherein the front substrate is associated with a transmissive and absorbing front polarizer and wherein the rear substrate is associated with an absorbing and reflective rear polarizer, and wherein the decorative pattern is disposed between the rear substrate and the rear polarizer.

6. The display device according to claim 1, wherein the front substrate is associated with a transmissive and absorbing front polarizer and wherein the rear substrate is associated with an absorbing and reflective rear polarizer, and wherein the decorative pattern is disposed between the front substrate and the front polarizer.

7. The display device according to claim 1, wherein the front substrate is associated with a transmissive and absorbing front polarizer and wherein the rear substrate is associated with a reflector and wherein the decorative pattern is disposed between the front substrate and the front polarizer.

8. The display device according to claim 1, wherein the liquid crystal composition comprises a dichroic colorant and wherein the rear substrate is associated with a reflector and wherein the decorative pattern is disposed either on the outer surface of the front substrate or between the rear substrate and the reflector.

9. The display device according to claim 1, wherein the liquid crystal composition comprises a dichroic colorant, wherein the front substrate is associated with a transmissive absorbing polarizer and wherein the rear substrate is associated with a reflector, and wherein the decorative pattern is disposed either between the front polarizer and the front substrate or between the rear substrate and the reflector.

10. The display device according to claim 1, wherein the liquid crystal composition comprises a dichroic colorant, wherein the rear substrate is associated with an absorbing reflective rear polarizer and wherein the decorative pattern is disposed between the rear polarizer and the rear substrate.

11. The display device according to claim 5, wherein the rear polarizer is replaced with a transflective polarizer and wherein a backlighting device is disposed at the rear of the transflective polarizer.

12. The display device according to claim 5, wherein the rear polarizer is replaced with a transmissive absorbing polarizer and wherein a backlighting device is disposed at the rear of the transflective polarizer.

13. The display device according to claim 11, wherein the backlighting device emits a light the colour of which is modulable.

14. The display device according to claim 1, wherein the decorative pattern is in direct contact with the front substrate and another decorative pattern is in direct contact with the rear substrate and wherein the decorative pattern and the another decorative pattern complement one another by juxtaposition such as to form an overall decorative pattern.

15. A dial assembly for a timepiece comprising a dial and a display device comprising:

two facing transparent substrates designated respectively front substrate and rear substrate, the front substrate being same disposed on the observer side, the front and rear substrates being directly provided on the inner faces thereof with transparent structured electrodes whereof the superposition defines shape pixels switchable between two optical states, the electrodes being connected to a voltage source via a control circuit, and the two facing transparent substrates forming a cell closed by a sealing frame for receiving a liquid crystal composition in a space delimited by the substrates and the sealing frame;

a decorative pattern in direct contact with the front substrate and/or the rear substrate; and the liquid crystal composition, the liquid crystal composition being between the two facing transparent substrates, wherein the shape pixels comprise crescent-shaped pixels and the shape pixels, in combination, have a shape of a celestial body, and wherein the decorative pattern is aligned with the transparent structured electrodes such that the decorative pattern has the shape of the celestial body and a size of the shape pixels.

16. A timepiece and/or piece of jewellery comprising a display device comprising:

two facing transparent substrates designated respectively front substrate and rear substrate, the front substrate being same disposed on the observer side, the front and rear substrates being directly provided on the inner faces thereof with transparent structured electrodes whereof the superposition defines shape pixels switchable between two optical states, the electrodes being connected to a voltage source via a control circuit, and the two facing transparent substrates forming a cell closed by a sealing frame for receiving a liquid crystal composition in a space delimited by the substrates and the sealing frame;

a decorative pattern in direct contact with the front substrate and/or the rear substrate; and the liquid crystal composition, the liquid crystal composition being between the two facing transparent substrates, wherein the shape pixels comprise crescent-shaped pixels and the shape pixels, in combination, have a shape of a celestial body, and wherein the decorative pattern is aligned with the transparent structured electrodes such that the decorative pattern has the shape of the celestial body and a size of the shape pixels.

17. The timepiece and/or piece of jewellery according to claim 16, wherein the decorative pattern is an image of a celestial body, and the shape pixels are configured to represent an animated image of said celestial body.

18. The timepiece and/or piece of jewellery according to claim 17, wherein the celestial body is the moon and the shape pixels are configured to represent phases of the moon.

19. The display device according to claim 1, wherein the decorative pattern comprises at least one structured ink layer.

* * * * *